United States Patent [19]

Geffroy et al.

[11] Patent Number: 4,741,543
[45] Date of Patent: May 3, 1988

[54] PISTON SCRAPER RING

[76] Inventors: Robert Geffroy; Christophe Geffroy, both of 1 Blvd., Richard Wallace Neuilly/s/s Maillot 38-57, Paris, France

[21] Appl. No.: 9,223

[22] Filed: Jan. 30, 1987

[30] Foreign Application Priority Data

Feb. 14, 1986 [FR] France .............................. 86 023033

[51] Int. Cl.[4] .......................... F16J 9/12; F16J 9/00; F16J 9/20
[52] U.S. Cl. ..................................... 277/216; 92/158; 92/212; 92/240; 92/246; 277/148; 277/139
[58] Field of Search .............. 277/173, 176, 184, 189, 277/236, DIG. 6, 216, 220, 148, 139; 92/193 R, 194, 160, 240, 241, 246, 245, 158, 159; 23/193 P

[56] References Cited

U.S. PATENT DOCUMENTS

| 2,663,602 | 12/1953 | Olsen | 277/216 |
| 4,212,472 | 7/1980 | Mizuno et al. | 277/DIG. 6 X |
| 4,516,481 | 5/1985 | Geffroy et al. | 92/158 X |
| 4,629,200 | 12/1986 | Ruddy | 277/DIG. 6 X |
| 4,669,369 | 6/1987 | Holt et al. | 92/160 |

Primary Examiner—Donald Watkins
Attorney, Agent, or Firm—Lloyd M. Forster

[57] ABSTRACT

A cylinder and piston assembly with an oil scraper ring having a radially washer seated in a radial piston groove, and a scraping skirt having a radially resilient truncated portion with the base edge engaging the cylinder wall in a scraping line located in or substantially close to the median plane of the washer so as to avoid bending moments on the washer tending to interfere with its free radial movement in the piston groove as required to maintain uniform scraping contact with the cylinder wall.

18 Claims, 1 Drawing Sheet

PISTON SCRAPER RING

BACKGROUND OF THE INVENTION

1. Field of the Invention

The present invention concerns the field of piston rings for a sliding piston within a cylinder employed in an internal combustion engine, compressor or a piston pump.

It is known in the art that in general the particular objective of one of the rings is to collect the lubricant deposited on the cylinder wall and to send it back to the crankcase. This ring is generally known as the "scraper ring".

The invention is more particularly concerned with a scraper ring including a washer, as well as a scraping skirt which includes a truncated portion open towards the crankcase and presenting, at one end, a scraping line which comes in contact with the cylinder wall. The washer is used for mounting the ring in a "support" groove of the piston.

2. Description of Related Art

This type of scraper ring is in particular described in French Pat. Nos. 81.02353, 81.24100 and 82.00625 as well as corresponding U.S. Pat. No. 4,516,481. These patents describe several ways of producing a scraper ring composed of a flat washer on the outer edge of which is joined a truncated scraping skirt whose extended line is free and extends to a scraping line contact with the cylinder wall.

The applicants have carried out numerous tests on this type of ring. During this operational testing, several technical problems were encountered in certain situations when, during operation, the washer was subject to radial frictional forces in this groove. Radial freedom of movement of the washer in its groove is important for trouble-free functioning of the scraper ring when, during operation, the piston is subject to slight radial movements within the limit of its clearance within the cylinder. These movements should be accommodated by sliding motion of the washer in the piston groove so that the ring does not lose uniform pressure of contact with the cylinder along part of its circumference leaving corresponding zones on the cylinder which are not properly scraped.

By continuing their research, applicants discovered that a substantial axial distance between the scraping line and the median washer plane of the ring had the effect of producing a rocking moment on the washer causing it to bind in the scraper ring groove, with resilient radial friction, interfering with desired radially free functioning of the scraper ring. This technical problem involves all scraper rings which include a substantially flat washer as support for the scraper ring and a scraping line which is located axially, substantially outside of the median plane of the washer. It has been the subject of studies and experiments on the part of the applicants to their discoveries and developments of the scraper ring of the present invention.

SUMMARY OF THE INVENTION

According to the invention, the scraper ring is characterized by a scraping skirt constructed so that the scraping line is substantially in or close to the median plane of the support ring. This general characteristic offers the advantage of reducing or even eliminating the above-mentioned rocking movement which provides the scraper ring with virtual radial freedom in its groove, which is the main object of the invention.

According to another characteristic of the invention, the skirt extends from its truncated portion through a fold to a linking portion which joins the substantially flat washer to the truncated portion. According to the preferred method of fabrication, the truncated portion and the linking portion form an annular arch.

The advantageous characteristics described above combine with scraper ring characteristics disclosed in the above-cited patents to include all advantages in a scraper ring which has a markedly improved and particularly high level of performance.

Thus, according to the preferred method of fabrications, particularly advantageous for the invention and known through the previous patents, the truncated portion has divided blades which are joined at the end opposite the scraping line, and are contiguous in such a manner that this portion is substantially leakproof between the upper and lower end of the piston. Similarly, the skirt of this ring, according to the preferred style of production of the present invention, is manufactured in very thin flexible metal, for instance, between 0.12 and 0.20 millimeters thick, and the angle formed by the above-mentioned truncated portion with a cylinder wall is very small, i. e. approximately 7 degrees.

The result is a ring which offers not only high efficiency for scraping and recycling the oil—effective scraping during the descent of the piston, and recycling by dynamic effect (the Kingsbury effect) to the crankcase side of the ring during the ascending stroke of the piston—but which is also substantially free, during operation, from frictional forces which might oppose any incidental radial ring displacements within the piston groove.

The applicants also discovered, because of the thinness of the metal used, that a problem resulted from the lack of rigidity of the scraper rings when not installed in a piston. This lack of rigidity, in fact, exposed them to possible deformation during handling in stores, shipment and assembly. According to another aspect of the present invention, this problem is solved, in a general way, by providing a washer of more substantial thickness.

In the preferred production embodiment, the washer includes two distinct parts: the first comprises an "assembly" washer integrally fabricated from the same metal sheet as the skirt, and the second comprises a "strengthening" washer attached to the assembly washer.

These characteristics offer the advantage of providing the scraper ring with rigidity sufficient for reducing or eliminating the above-mentioned risks of deformation, and as a corollary advantage provides the shim thickness needed for the assembly of certain rings in their support groove, as described in the above-mentioned patents, since a groove which is too narrow can not easily be machined in commercial production.

The applicants also observed that the circumferential radial rigidity of the very thin support ring brought about opening difficulties for mounting it in the piston groove. This problem is solved in the present invention by providing a segmented ring comprising at least two equal discrete sectors which abut circumferencially when assembled in the piston groove.

In the preferred production method, the ends engage in the radial plane of the ring and are easy to put in place separately. This significant characteristic presents, among other things, the advantage of combining a decrease in the risk of deformation with a greater ease in assembly.

Finally, during testing of the above-mentioned former state-of-the-art production scraper rings, applicants discovered, under certain conditions, an insufficient flexibility, in the required hinge effect along the attachment fold of the blades at the apex of the annular arch. Because of this insufficiency, the blades, in operating position, were subject to bulging thereby creating intermediate clearance greater than the micrometric amount of clearance allowed for in construction with detrimental reduction in the skirt's sealing qualities.

The present invention solves this problem by decreasing the thickness of the flexible metal of the ring along the apex fold which functions as the hinge for each blade. In addition, this feature may somewhat alleviate the requirement for extreme thinness of the scraper ring metal.

The present invention has general application to oil lubricated piston and cylinder assemblies such as employed in internal combustion engines, compressors or pumps, including at least one piston equipped with a scraper ring such as that described herein.

We have observed, that the use of rings conforming to this invention in internal combusion engines will allow for an improvement in the performance of these engines, due to a significant decrease in friction.

It should be noted, according to the performance of the invention's scraper ring, that this ring permits the use of high sealing compression rings, such as those described in the above-mentioned French Pat. Nos. 81.02353 and 82.00625, by controlling through its high efficiency, the reverse oil flow of leakproof compression rings.

Other characteristics and advantages of the invention are disclosed in the detailed description of one preferred embodiment of the invention, with reference to the attached drawings.

DESCRIPTION OF THE PREFERRED EMBODIMENT

Figure 1:
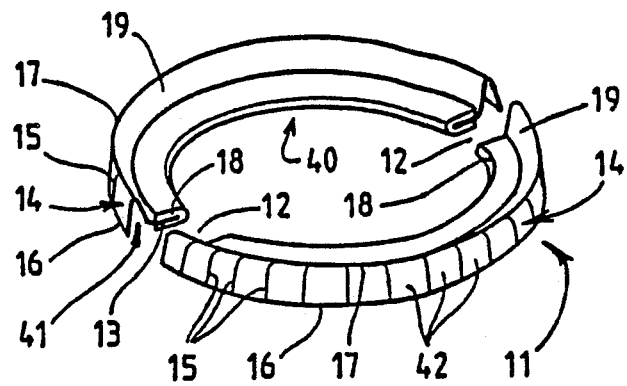
FIG. 1 represents, in perspective, an embodiment resulting from a preferred production method of a ring according to the invention cut into two half-ring segments.
Figure 2:
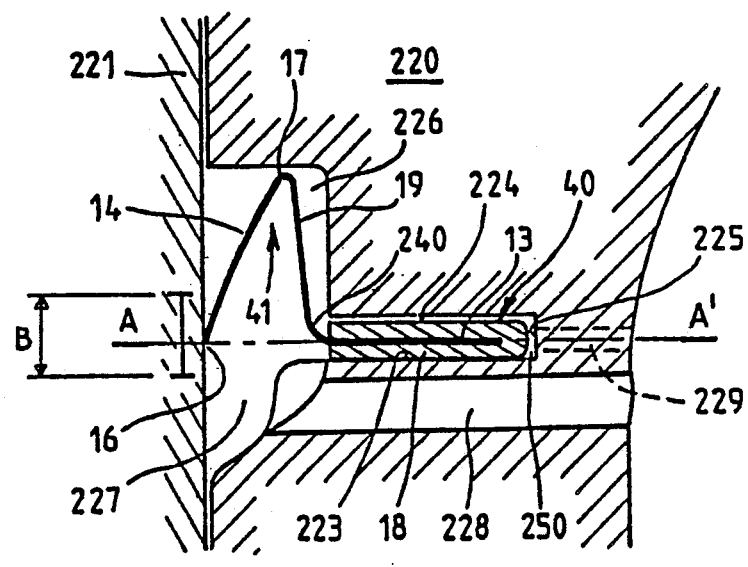
FIG. 2 is a radial section view of a ring fabricated according to this same production method, mounted in operating position on a piston sliding in a cylinder.

FIG. 1 illustrates a preferred production embodiment of the scraper ring 11 which is the subject of this invention, intended for mounting on a piston 220 sliding within a cylinder 221, which can be perceived more clearly in FIG. 2. The piston 220 includes a peripheral groove 223 for washer. This washer includes a substantially flat washer 40 and a scraping skirt 41 which has a truncated conical portion 14 presenting, at one of its ends, a perimetrical base scraping edge line 16 which comes in contact with the cylinder wall 221. In this preferred embodiment the washer 40 includes two parts 13, 18 which will be described below.

Generally, according to one feature of the invention, the scraping line 16 is located in or substantially close to the median plane of the washer. This median plane is shown in FIG. 2 by the radial line A—A'.

Within the meaning of this invention, the expression "scraping line in or substantially close to the median plane" should be interpreted as meaning that the scraping line is arranged inside an axial range which extends within narrow limits on either side of the median plane of the washer, a range which is small compared to the diameter of the ring. Thus, in FIG. 2, this range has been shown "B", representing a size of a few millimeters compared to a ring diameter of approximately eighty millimeters.

According to another characteristic of the invention, the skirt includes, in addition to the truncated portion 14, a fold 17 and a linking portion 19 which join the washer 40 to the truncated portion. This permits the truncated portion to present itself on the cylinder wall with the same geometry as described in the previously mentioned patents.

According to a preferred production method of this invention, the scraping skirt 41, comprising the truncated portion 14, the fold 17 and the linking portion 19, forms an integral annular arch. Besides the advantage that this arrangement is very easy to form, it provides a supplemental radial flexibility for the skirt, which contributes to improved functioning of the scraper segments.

The support groove 223 for the scraper ring is completed by a cylindrical annulus 226 which receives, without radial contact with the piston, the skirt 41 of the scraper ring and by an annular recess 227 for receiving the scraped oil which is returned to the crankcase by way of the hollow center of the piston through a plurality of radial holes 228 arranged around the piston. Supplemental radial holes 229 may also be provided between the bottom of the groove 225 and the hollow center of the piston.

In the preferred production embodiment for this invention, the truncated portion 14 comprises individual radially resilient blades 42 of very thin flexible metal joined around the fold 17, and contiguous so that said portion 14 is substantially leakproof between the upper and lower part of the piston. In fact, and as it is shown in the above-mentioned patents, the amount of clearance resulting from the slits 15 between the blades is on the order of a few micrometers, when the ring is in place in the cylinder, compared to a ring diameter of about 80 mm. This amount of clearance between adjacent slit edges is virtually leakproof against the passage of a lubricant having a viscosity such as hot oil which is generally used in internal combustion engines or, more generally, in the ensemble of pistons sliding within cylinders. The blades 42 are flexible around a fold line 17 which is, in effect, the "hinge" of these blades. This hinge effect results, as described in the above-cited patents from the small width of these blades and the thinness of the metals used in their production. According to the production method which is particularly advantageous for the scraper ring shown in these figures, the skirt is preferably made of very thin, for instance,—between 0.12 and 0.20 millimeters thick—and flexible steel.

Figure 3:
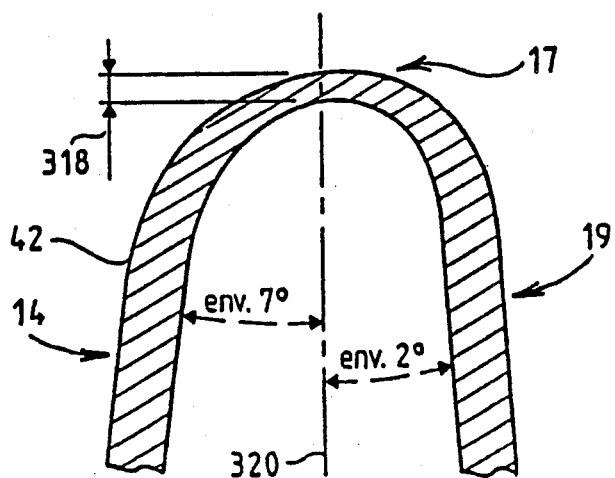
FIG. 3 represents a highly enlarged fragmentary section of a typical fold on which are pivoted the blades of a scraper ring according to the invention.

FIG. 3 shows a very enlarged sectional view of the top of the skirt 41, on which one can see a blade 42, the area of joining, and the circular fold 17. This circular fold includes a thinning 318 of the metal of portions 14 and 19 of the skirt 41. This thinning may be obtained by any single or combination of known methods, for example by removing some metal, stretching, or compressing which occurs during the forming of part 19, the fold 17 and the blades 42.

As shown, the linking portion 19 is almost cylindrical with an angle formed in axial section by portion 19 with an axial orientation axis 320 passing, on FIG. 3, approximately in the middle of fold 17, of about 2 degrees, an angle needed for the withdrawal of the drawing punch. The angle formed by truncated portion 14 with the axis 320 is preferably 7°, although shown at a somewhat exaggerated greater angle in FIG. 2. We know, notably by the above-mentioned art anterieur, that such an angle is favorable to the Kingsbury effect.

The thinning 318 of the ring localizes on the surface line of folding 17 providing a primary flexing area for the blades 42. Accordingly, flexibility of the truncated part of the blades 42, due to their extreme thinness, may be reduced to the extent of the increase in the flexibility of the fold 17.

Thus, for a ring 80 mm in diameter, which might be fabricated, for example, out of steel which is 0.20 mm thick, a thinning of the fold, which will be reduced, for example, to 0.13 mm, allows a change in the thickness of the entire ring to 0.25 or 0.30 mm, which is still relatively thin and allows the same extremely low contact pressure of blades 42 against the cylinder. Finally, the thinning 318 and related corresponding adjustment in the thinness of the blades reduces the risk of blade deformation by bulging toward the exterior. Such bulging, by increasing the gap between blades normally desinged to be on the order of only a few micrometers, could negatively affect the leakproof quality of the ring.

According to another characteristic of the invention the washer 40 has a substantial thickness, for example from 5 to 10 times greater than the thickness of the blades. Such a characteristic allows the ring to be more rigid, which is particularly advantageous when this latter is not on the piston, as a spare part, or during its mounting on the piston. The production method shown illustrates one possible, and preferred, fabrication of this feature of the invention wherein the washer 40 includes two parts 13 and 18. The first is constituted as an "assembly" ring, which extends from the same sheet metal as the skirt and is connected by a fold 240 to the linking portion 19 of the skirt.

The second part is made as separate ring 18, designated a "strengthening" ring, significantly thicker, for instance,—here several tenths of a millimeter. The strengthening ring 18 as shown has a U shaped section, enclosing the assembly ring. In the method of fabrication illustrated, it is crimped onto the assembly ring 13.

Other types of fabrication of this feature of the invention are possible. However, at least in certain applications, the washer 40 preferably should have a substantial thickness which, in addition to other advantages, rigidifies the ring.

Similarly, this thick washer takes the place of any shim which might be needed for mounting the assembly ring 13 of very thin metal in the piston groove designed for it, if the washer was only made of this assembly ring 13. The dimensions of the substantially thick washer are calculated in such a way as to leave an axial clearance 224 and a radial clearance 225 between the groove 223 and the substantially thick washer 40, in order to allow, radial displacements relative to the piston.

Accordingly, the piston includes a circular ring support groove 223 wherein clearances are sufficient to assure the radial interdependence of the ring and the cylinder and radial independence of the ring and the piston, while still being small enough to reduce to a minimum the passage of oil around the ring. Typically, this corresponds to an axial clearance on the order of 0.03 mm and a radial clearance on the order of 0.15 mm for a piston 80 mm in diameter.

Thus one may observe that by locating the scraping line 16 in or substantially close to the median plane (A—A' on FIG. 2) of the washer 40 avoids during the descent of the piston, notably during the scraping operation, the rocking moment on the washer which would occur when the line of scraping is substantially distant from this median plane. As a result, the radial movements of the washer 40, within the piston groove 223 to the limits of the radial clearance 225, which are necessary in order to accommodate the small radial movement of the scraper ring, may take place without constraint.

Ring assembly is also facilitated by another advantageous characteristic, according to which the ring has at least two segments resulting from separations 12 evenly distributed around the circumference and each one oriented in a radial plane which contains the ring axis. These parts of the ring are mounted separately in the groove 223 of the piston 220.

The preceding description of a preferred embodiment is subject to variations in fabrication within the scope of the invention as claimed. In particular, the skirt may have a form quite different from that of an arch, on condition, however, of having a line of scraping which stays in or substantially close to the median plane of the washer as disclosed herein.

We claim:

1. A cylinder and reciprocable oil lubricated piston assembly equipped with an oil scraper ring including a radially washer (40) seated in a radial piston groove (223) and a scraping skirt (41) having a radially resilient truncated portion (14) with a base edge engaging the cylinder wall in a scraping line (16), characterized by the location of said base edge scraping line in or substantially close to the median plane (A—A') of said washer.

2. The combination of claim 1 characterized by said skirt having a linking portion (19) which joins the washer to the truncated portion.

3. The combination of claim 2 further characterized by the formation of said truncated portion and said linking portion as an annular arch (17) with a fold at the apex.

4. The combination of claim 3 further characterized by the formation of said truncated portion with individual radially resilient blades (42) extending from the apex of said arch in contiguous relation providing a substantially oil leak proof separation between the inside and outside of said skirt.

5. The combination of claim 4 further characterized by at least said truncated portion comprising a thin flexible metal.

6. The combination of claim 5 further characterized by said washer having a relatively more substantial thickness.

7. The combination of claim 6 further characterized by the construction of said washer as a composite of an "assembly" ring (13) comprising an integral extension of said skirt linking portion and a separate strengthening ring (18) attached to said assembly ring.

8. The combination of claim 7 wherein said strengthening ring comprises a U-shaped section enclosing said assembly ring.

9. The combination of claim 1 further characterized by the construction of said scraper ring in multiple separate segments with ends engaging in a radial axial plane of the scraper ring when assembled in said piston groove.

10. The combination of claim 4 further characterized by an arch fold constructed with a thinner, more flexible section relative to the thin flexible metal of said truncated portion and said linking portion.

11. The combination of claim 10 further characterized by said truncated linking and washer portions being integrally constructed of uniform flexible metal in the order of 0.20 to 0.30 millimeters thick with said intermediate arch fold reduced in thickness by approximately 25 to 50%.

12. The combination of claim 4 wherein said piston is provided with a cylindrical annulus (226) which receives without radial contact with the piston the skirt 41 and with an annular recess 227 which is in communication with a crankcase for the piston.

13. The combination of claim 12 wherein said piston is constructed with a hollow cavity radially inside of said scraper ring with oil passage means extending between said cavity and the annular recess 227 for conducting scraped oil into said piston cavity.

14. The combination of claim 13 including supplemental passage means extending radially inward from the inner extremity of said washer groove to said piston cavity.

15. A scraping ring for an oil lubricated piston sliding in a cylinder comprising a washer supporting a scraping skirt having a radially resilient truncated portion with a base edge for engaging the cylinder wall in a scraping line, characterized by the location of said base edge scraping line in or substantially close to the median plane of said washer.

16. The scraping ring of claim 15 wherein said skirt is formed as a flexible thin metal annular arch having an outer truncated portion divided into individually flexible blades terminating in said base edge scraping line.

17. The scraper ring of claim 16 wherein the apex of said arch comprises a fold of reduced thickness.

18. The scraper ring of claim 16 wherein said support ring comprises an assembly ring integral extension of said skirt with a strengthening washer attached thereto.

* * * * *